US012631506B2

(12) United States Patent
Johnson

(10) Patent No.: US 12,631,506 B2
(45) Date of Patent: May 19, 2026

(54) PRINTED ELECTRONIC SENSING DEVICE AND APPLICATIONS THEREOF

(71) Applicant: Reid Group Pty Ltd, Clontarf (AU)

(72) Inventor: Clem Johnson, Clontarf (AU)

(73) Assignee: Reid Group Pty Ltd, Clontarf (AU)

( * ) Notice: Subject to any disclaimer, the term of this patent is extended or adjusted under 35 U.S.C. 154(b) by 377 days.

(21) Appl. No.: 18/561,728

(22) PCT Filed: May 20, 2022

(86) PCT No.: PCT/AU2022/050488
§ 371 (c)(1),
(2) Date: Nov. 16, 2023

(87) PCT Pub. No.: WO2022/241521
PCT Pub. Date: Nov. 24, 2022

(65) Prior Publication Data
US 2024/0230438 A1 Jul. 11, 2024

(30) Foreign Application Priority Data

May 21, 2021 (AU) ................................ 2021901518

(51) Int. Cl.
*G01L 5/165* (2020.01)
*A43B 17/00* (2006.01)
(Continued)

(52) U.S. Cl.
CPC .............. *G01L 5/165* (2013.01); *G01L 5/161* (2013.01)

(58) Field of Classification Search
USPC .................................................... 73/862.627
See application file for complete search history.

(56) References Cited

U.S. PATENT DOCUMENTS 8,739,639 B2 * 6/2014 Owings ................ A61B 5/1036
73/862.391
10,451,493 B2 10/2019 Mathieu et al.
(Continued)

FOREIGN PATENT DOCUMENTS

EP 3235428 A1 10/2017

OTHER PUBLICATIONS

International Search Report (ISR) [form PCT/ISA/210] from PCT/AU2022/050488 (Aug. 19, 2022).
(Continued)

*Primary Examiner* — Brandi N Hopkins
(74) *Attorney, Agent, or Firm* — Sierra IP Law, PC; Mark D. Miller

(57) ABSTRACT

A printed electronic sensing device is provided for use with insole devices, gripping devices and other similar articles. The printed electronic sensing device is configured to measure force applied thereon and at least one of proximity and friction. In one form, the electronic sensing device includes a flexible, substantially planar substrate having a pair of opposed surfaces, including a first surface and an opposed second surface, at least one force sensing resistor (FSR) additively printed on the first surface, said FSR configured to sense pressure applied to the device, and at least one capacitive sensor additively printed on the second surface, said at least one capacitive sensor configured to sense at least one of sliding of an object across the second surface and proximity to the object relative to the second surface of the device.

20 Claims, 4 Drawing Sheets

(51) Int. Cl.

| | |
|---|---|
| *A61B 5/00* | (2006.01) |
| *G01L 1/14* | (2006.01) |
| *G01L 1/18* | (2006.01) |
| *G01L 5/161* | (2020.01) |

(56) References Cited

U.S. PATENT DOCUMENTS

| | | | |
|---|---|---|---|
| 2012/0055257 | A1 | 3/2012 | Shaw-Klein |
| 2018/0249945 | A1* | 9/2018 | Najafi ................... A61B 5/112 |
| 2019/0000177 | A1 | 1/2019 | Dervish et al. |
| 2020/0378847 | A1 | 12/2020 | Elboim et al. |

OTHER PUBLICATIONS

Written Opinion of the International Searching Authority [form PCT/ISA/237] from PCT/AU2022/050488 (Oct. 6, 2022).

Applicant's demand for International Preliminary Examination from PCT/AU2022/050488 (Oct. 6, 2022).

International Preliminary Report on Patentability (IPEA) [form PCT/IPEA/409] from PCT/AU2022/050488 (Sep. 1, 2023).

* cited by examiner

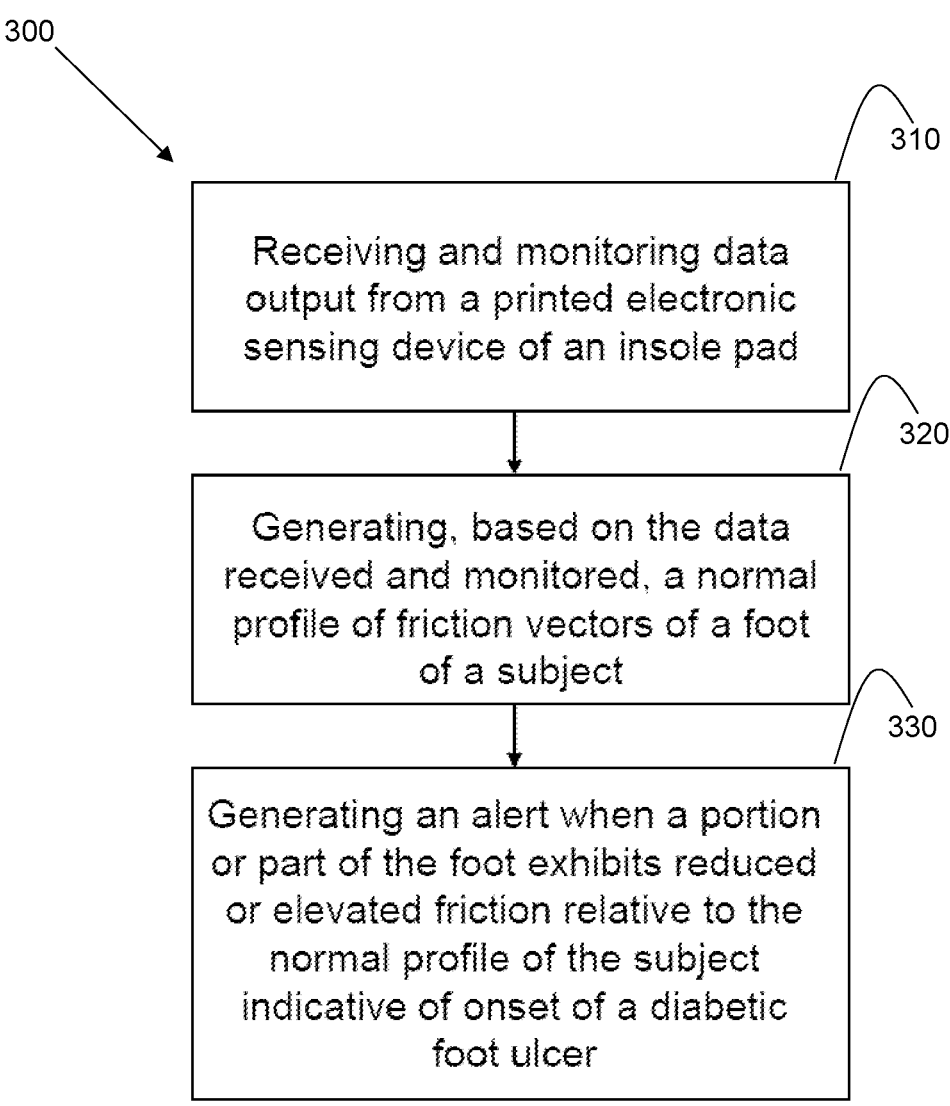

300

310

Receiving and monitoring data output from a printed electronic sensing device of an insole pad

320

Generating, based on the data received and monitored, a normal profile of friction vectors of a foot of a subject

330

Generating an alert when a portion or part of the foot exhibits reduced or elevated friction relative to the normal profile of the subject indicative of onset of a diabetic foot ulcer

Figure 3

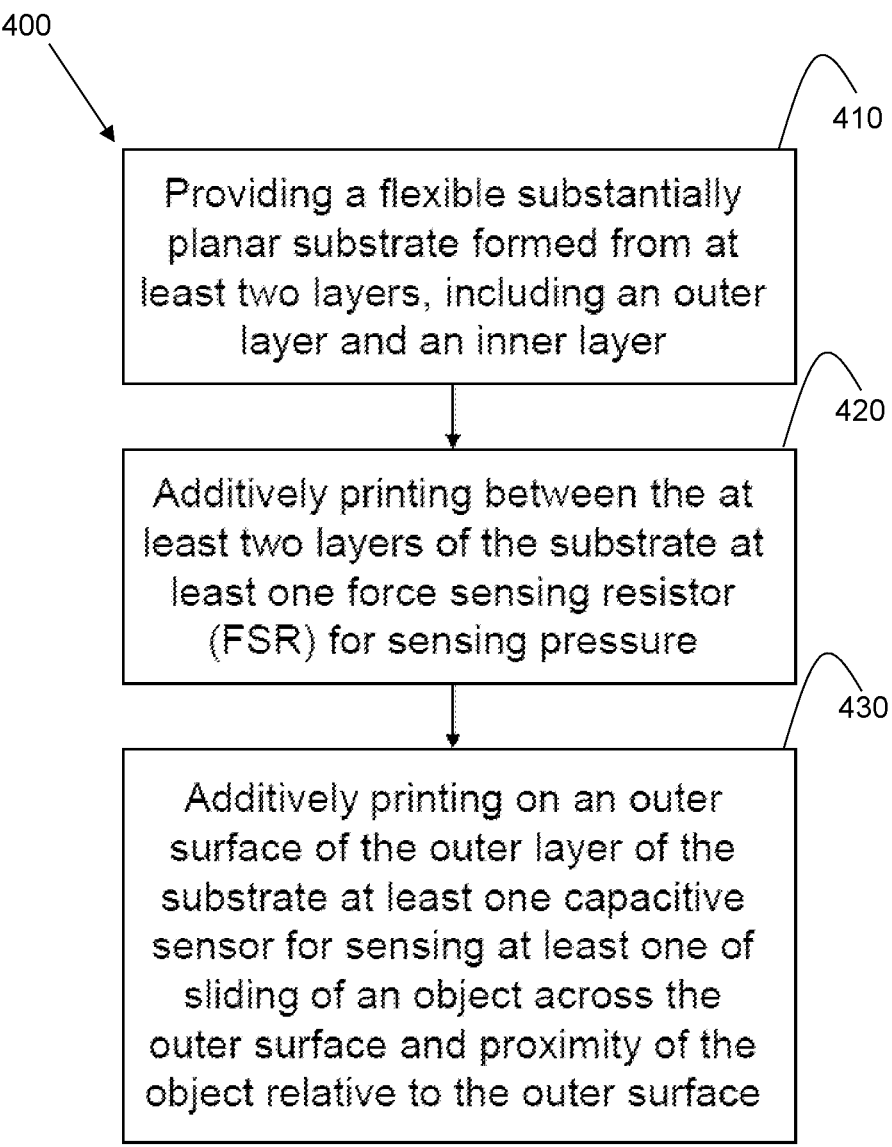

400

410

Providing a flexible substantially planar substrate formed from at least two layers, including an outer layer and an inner layer

420

Additively printing between the at least two layers of the substrate at least one force sensing resistor (FSR) for sensing pressure

430

Additively printing on an outer surface of the outer layer of the substrate at least one capacitive sensor for sensing at least one of sliding of an object across the outer surface and proximity of the object relative to the outer surface

Figure 4

PRINTED ELECTRONIC SENSING DEVICE AND APPLICATIONS THEREOF

TECHNICAL FIELD

The present invention relates to printed electronic sensing devices. In particular, the present invention concerns printed electronic sensing devices capable of simultaneously sensing pressure and friction and applications thereof.

BACKGROUND

Printed electronic sensing devices are becoming increasingly popular as they are relatively low cost and can be printed on flexible substrates, such as, e.g., fabric, a polymer film, or paper.

Such sensing devices have been printed for sensing shock, inertial movement, humidity, pressure force, temperature, light, chemicals, and biologics.

An exemplary example of the use of such sensing devices is as a diabetic orthotic for predicting the risk of a subject developing a foot ulcer based upon a plurality of pressure and temperature sensors.

By way of background, diabetic foot ulceration is a co-morbidity affecting many patients with diabetes. Contributing factors that increase the risk of developing diabetic foot ulcers include nerve damage disorders associated with diabetes, an altered gait and increased localised plantar pressure.

However, recent research has found that temperature and pressure may not be optimal parameters to monitor when predicting foot ulceration, particularly since both parameters are prone to false positive readings simply through prolonged wearing of a shoe incorporating such sensors.

Indeed, recent research suggests that additionally monitoring other parameters, such as, e.g., shear or friction together with humidity, may provide a more reliable prediction of foot ulceration.

Earlier printed electronic sensing devices have attempted to measure both force and shear.

For example, U.S. Pat. No. 10,451,493 B2 discloses a printed electronic sensor including a plurality of capacitive sensors each configured to sense normal pressure in different directions. In use, the further capacitive sensors are intended to measure shear stress in the different directions. However, the resulting electronic sensor is bulky, overly complicated and inaccurate in that it attempts to measure pressure at different points and derive a friction measurement.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a printed electronic sensing device and applications and methods of use thereof, which may at least partially address one or more of the problems or deficiencies mentioned above or which may provide the public with a useful or commercial choice.

According to a first aspect of the present invention, there is provided a printed electronic sensing device including:
- a flexible, substantially planar substrate having a pair of opposed surfaces, including a first surface and an opposed second surface;

at least one force sensing resistor (FSR) additively printed on the first surface, said FSR configured to sense pressure applied to the device; and at least one capacitive sensor additively printed on the second surface, said at least one capacitive sensor configured to sense at least one of sliding of an object across the second surface and proximity to the object relative to the second surface of the device.

According to a second aspect of the present invention, there is provided a printed electronic sensing device including:
- a flexible, substantially planar substrate formed from at least two layers, including an outer layer and an inner layer;
- at least one force sensing resistor (FSR) additively printed between the at least two layers of the substrate, said FSR configured to sense pressure applied to the device; and
- at least one capacitive sensor additively printed on an outer surface of at least one of the inner layer and the outer layer of the substrate, said at least one capacitive sensor configured to sense at least one of sliding of an object across the outer surface and proximity of the object relative to the outer surface of the device.

According to a third aspect of the present invention, there is provided a printed electronic sensing device for measuring friction of an object relative to the device, said device including:
- a flexible, substantially planar substrate formed from at least two layers, including an outer layer and an inner layer;
- at least one force sensing resistor (FSR) additively printed between the at least two layers of the substrate, said FSR configured to sense pressure of the object relative to the device; and
- at least one capacitive sensor additively printed on an outer surface of at least one of the inner layer and the outer layer of the substrate, said at least one capacitive sensor configured to sense sliding of the object relative to the outer surface of the device,
- wherein the at least one FSR and the at least one capacitive sensor together enable the device to measure the friction of the object relative to the device.

According to a fourth aspect of the present invention, there is provided a printed electronic sensing device for sensing pressure and proximity, said device including:
- a flexible, substantially planar substrate formed from at least two layers, including an outer layer and an inner layer;
- at least one force sensing resistor (FSR) additively printed between the at least two layers of the substrate, said FSR configured to sense pressure applied to the device; and
- at least one capacitive sensor additively printed on an outer surface of at least one of the inner layer and the outer layer of the substrate, said at least one capacitive sensor configured to sense proximity of an object relative to the outer surface of the device.

Advantageously, the present invention provides a printed electronic sensing device capable of measuring friction at a single point through the overlaying FSRs and capacitive sensors. By being printed on a flexible, substantially planar substrate, the printed electronic sensing device provides immediate advantages over conventional rigid/surface mounted friction and force of friction sensors, including the ability to be applied across or around non-linear, non-flat and/or unorthodox shapes and surfaces. Further, by way of its construction, the printed electronic sensing device is more durable and waterproof compared to conventional PCB-based counterparts and capable of nearly endless application. Lastly, and again by nature of its construction, the printed electronic sensing device is substantially recyclable.

As indicated above, the present invention provides a printed electronic sensing device for sensing pressure and friction or shear, and in some embodiments pressure and proximity. Exemplary applications of the printed electronic sensing device include as an insole device or part thereof for use in prevention of diabetic foot ulcers, as part of a robotic gripping device or prosthetic and/or in a device for monitoring brake pad wear. However, a person skilled in the art will appreciate that the printed electronic sensing device of the present invention is capable of broader applications, such as, e.g., in wearable technology and in any part or portion of a device, assembly or machine where a measurement of friction is required.

As used herein, the term "friction" refers to a force resisting the relative motion of solid surfaces, fluid layers and material elements sliding against each other. Generally, the force of friction is determined as the product of the coefficient of friction ($\mu$) and the normal force ($F_n$), i.e., $F=\mu F_n$. The normal force ($F_n$) is defined as the net force compressing the objects together.

As indicated, the device includes a flexible, substantially planar substrate upon which at least components of the at least one FSR and the at least one capacitive sensor may be additively printed.

The substrate may be of any suitable size, shape and construction, and may be formed from any suitable material or materials.

Generally, the substrate may be a thin flexible substrate. The substrate may have a pair of opposed surfaces interconnected by opposing edges.

The opposed surfaces may include a first surface and an opposed second surface.

The first surface may include a fastening surface adapted to be fastened to an object or article by one or more mechanical fasteners (such as, e.g., threaded fasteners, rivets, snap fasteners and the like and/or chemical fasteners (such as, e.g., a thermo adhesive, a wet adhesive, a dry adhesive or a double-sided adhesive tape).

The second surface may include an outwardly-facing surface configured to face outwardly from the object or article to which it is fastened.

In some embodiments, the substrate may be a flexible foil or paper.

In other embodiments, the substrate may be formed from a plastic material or materials. For example, the substrate may be formed from polyester, polyethylene terephthalate ("PET"), polyethylene naphthalate ("PEN"), polyimide ("PI") or polyurethane ("PU"), typically PET.

In other embodiments, the substrate may be formed from paper, fabric or textile. Generally, if formed from paper, fabric or textile, the substrate may additionally include a coating or liner to enhance ink adhesion. Advantageously, application of a coating or liner on a surface of the paper, fabric or textile substrate may smoothen a rough surface to thereby enhance ink adhesion.

In some embodiments, the substrate may include a multiple layer substrate. For example, the substrate may include at least two layers, at least three layers, at least four layers or even at least five layers. In such embodiments, the multiple layers may be at least partially bonded to one another, such as, e.g., along a common edge. Alternatively, the multiple layers may be sandwiched or stacked atop one another and bonded together, such as, e.g., by lamination.

As indicated, the printed electronic sensing device includes at least one FSR additively printed on the first surface or on or between layers of the substrate and at least one capacitive sensor additively printed on the second surface or the outer surface of an inner or outer layer of the substrate, preferably the outer surface of the outer layer.

The at least one FSR and the at least one capacitive sensor may be additively printed using any suitable conductive ink and in any suitable way.

Generally, any suitable electrically functional ink may be used that is capable of functioning as any one of conductors, semiconductors, dielectrics and insulators. Typically, the ink may include any one of silicon, oxide semiconductors, poly(3,4-ethylene dioxitiophene, poly(styrene sulfonate), poly(aniline), poly(3-hexylthiophene), poly(9,9-dioctylfluorene co-bithiophen, poly(phenylene vinylene, conductive carbon ink (e.g., Loctite™ ECI range), force sensitive ink (e.g., Nagase ChemteX American Corporation CI-2050 LR FSR range), dielectric ink (e.g., Loctite™ EDAG range), silver nanoparticles, gold nanoparticles, copper nanoparticles or any combination thereof.

Likewise, the electrically functional ink may be applied to the substrate using any one of inkjet printing, screen printing, offset lithography, aerosol jet printing, evaporation printing, gravure printing and flexography.

The at least one FSR may be of any suitable size, shape and construction for measuring pressure (or a force) applied against the device.

The at least one FSR may include a conductive layer and a FSR element layer spaced apart from the conductive layer and arranged relative to one another such that the conductive layer and the FSR element layer face one another. In use, the FSR element layer may be configured to contact the conductive layer when a force is applied thereby causing a change in resistivity inversely proportional to the force applied and indicative of the pressure applied.

The conductive layer may include electrically conductive traces, preferably arranged into two sets of electrically distinct interdigitated fingers. The electrically conductive traces may be additively printed on the substrate with an electrically conductive ink to define the conductive layer, preferably printed with a silver conductive ink. Dielectric ink may be used to ensure the two sets of conductive traces remain electrically distinct.

Preferably, each trace may include a tail electrically connectable to a communication module or external component, such as, e.g., a microcomputer.

The FSR element layer may be additively printed on an opposing substrate layer with a force sensitive ink, such as, e.g., a carbon conductive ink. The FSR element layer may be printed to be of a same size as the conductive layer. Typically, the FSR element layer may be configured to deflect and yield to a force applied thereon and contact the underlying conductive layer. The FSR element layer may be printed to any suitable thickness on the opposing substrate layer.

The conductive layer and the FSR element layer may preferably be spaced apart from one another by a spacer layer extending therebetween. The spacer layer may extend around an edge of both the conductive layer and the FSR element layer to thereby define a space therebetween but also enable the layers to contact when a force is applied.

The spacer layer may be formed from any suitable dielectric material or materials.

Typically, the spacer layer may be configured to extend about a periphery of at least the electrically distinct interdigitated fingers of the conductive layer and the corresponding portion of the FSR element layer.

In principle, when a force is applied to the at least one FSR, the conductive layer and the FSR element layer are pressed together and the FSR element layer electrically connects the traces of the finger sets together with a resistance dependent on the applied force. Specifically, force and resistance are inversely proportional. Accordingly, any decrease in resistance of the FSR can be associated with an increase in force and is indicative that pressure (i.e., force) is being applied. Likewise, any increase in resistance of the FSR can be associated with a decrease in force and is indicative that pressure has lessened.

Approximate pressure or force measurements for a given resistance may be derived by plotting the inverse relationship between resistance and force applied.

When no force is applied, a space between the conductive layer and the FSR element layer is maintained by the spacer layer and the at least one FSR is an open circuit.

A person skilled in the art will appreciate that the spacer layer thickness and the FSR element layer thickness will mechanically determine an amount of force required for the two layers to come into contact and therefore a sensitivity for sensing force or pressure.

In some embodiments, the at least one FSR may be printed between layers of the substrate, preferably between adjacent layers. For example, the conductive layer may be printed on a first surface of a first layer of two adjacent layers of the substrate and the FSR element layer may be printed on an opposing second surface of second layer of the two adjacent layers, such that the second surface faces the first surface. The spacer layer may at least partially sit or lie between the first and second layers.

The at least one FSR may be of ShuntMode or ThruMode construction, preferably the former as a more linear response curve is more conducive to deriving pressure measurements.

In some embodiments, the printed electronic sensor device may include more than one FSR. For example, the device may include at least two, at least three, at least four, at least five, at least six, at least seven, at least eight, at least nine or at least 10 or more FSRs.

In preferred embodiments, the device may include a plurality of FSRs.

The plurality of FSRs may be arranged on the device in a discrete array or a matrix array, preferably the former.

In such embodiments, each discrete FSR may include two or more FSRs arranged side-by-side for measuring force distribution in two or more axes. The two or more FSRs may include two, three, four, five, six, seven or eight FSRs arranged side-by-side, preferably two, three or four.

The at least one capacitive sensor may be of any suitable size, shape and construction for sensing at least one of sliding of an object across the second surface or outer surface of the substrate and proximity to the object relative to the second surface or outer surface of the substrate of the device.

For example, in some embodiments, the at least one capacitive sensor may include, or form part of, a capacitive proximity sensor for detecting or sensing proximity of the object to the second surface or the outer surface of the substrate.

In preferred embodiments, the at least one capacitive sensor may include, or form part of, a capacitive slider mechanism for detecting or sensing sliding motion of the object across the second surface or the outer surface of the substrate. The sensor may detect sliding motion in a single axial direction.

The at least one capacitive sensor may include a conductive layer having electrically conductive traces of a same size as the conductive traces of the at least one FSR, preferably configured to overlay the conductive layer of the FSR in an electrically insulated manner.

In some embodiments, the electrically conductive traces of the conductive layer of the at least one capacitive sensor may be arranged into two or more sets of electrically distinct interdigitated fingers (i.e., a spatial interpolation arrangement). The traces may be additively printed on the substrate with an electrically conductive ink, preferably with a silver conductive ink to the second surface or outer surface of the substrate. Again, dielectric ink may be applied to ensure the two sets of conductive traces remain electrically distinct.

Again, each trace may include a tail electrically connectable to a communication module or external component, such as, e.g., a microcomputer.

In principle, the at least one capacitive sensor may detect or sense sliding motion of the object by a change in capacitance at the location at which the object contacts the sensor and a direction in which the object slides may be determined by a resulting change in capacitance of the sensor and the direction in which that change occurs. Accordingly, the direction in which the object slides relative to the sensor may be determined based upon the direction of resulting changes in capacitance of the electrically distinct interdigitated fingers.

In some embodiments, a cover layer may be applied atop the at least one capacitive sensor. The cover layer may be of any suitable thickness and formed from any suitable material or materials enabling functional operation of the at least one capacitive sensor.

Generally, the cover layer may have a thickness of between about 0.3 mm to about 6 mm, typically between about 0.5 mm to about 3 mm. Preferably, the cover layer may be formed from a material or materials having a sufficiently high dielectric constant, such as, e.g., polyethylene, polystyrene, FR-4, polyvinyl chloride, Mylar™ (Biaxially-oriented polyethylene terephthalate), polyamide and Lexan™ (polycarbonate).

In some embodiments, the printed electronic sensor device may include more than one capacitive sensor. For example, the device may include at least two, at least three, at least four, at least five, at least six, at least seven, at least eight, at least nine or at least 10 or more capacitive sensors.

In preferred embodiments, the device may include a plurality of capacitive sensors.

The plurality of capacitive sensors may be arranged on the device in a discrete array or a matrix array, preferably the former.

In some embodiments in which it is desirable to detect sliding motion in multi-axial directions, the device may include overlaid capacitive sensors in which the conductive traces of the respective sensors are oriented relative to each other to detect sliding motions in different axial directions.

In yet other embodiments in which the plurality of capacitive sensors are arranged in discrete arrays, the arrays may be oriented at different angles relative to one another to together detect sliding motions of the object in different axial directions.

In yet further embodiments, each discrete capacitive sensor in the discrete array may include two or more capacitive sensors arranged in a side-by-side arrangement and oriented relative to each other to detect sliding motion in different axial directions. The two or more capacitive sensors may include two, three, four, five, six, seven or eight capacitive sensors arranged side-by-side, preferably two, three or four.

In embodiments in which the at least one capacitive sensor functions as, or forms part of, a capacitive proximity sensor, the sensor may detect proximity by sensing or detecting a change in capacitance that occurs as the object nears or approaches the sensor. Typically, the sensor may have a range of between about 5 mm and 40 mm.

In some embodiments, the respective layers of the substrate and the components printed thereon may be arranged in a stacked arrangement, preferably with an adhesive applied therebetween.

Advantageously, by sensing force or pressure in conjunction with sliding movement of an object relative to the second surface or the outer surface of the device, the device may measure the force of friction of the object relative to the device. For example, the at least one FSR may provide an indication of the normal force compressing the object against the device and the at least one capacitive sensor may provide an indication as to when the object initially slides relative to the device.

As indicated, the printed electronic sensing device measure friction through the overlaying of FSRs and capacitive sensors, preferably at least one capacitive sensor overlaying at least one FSR. Advantageously, this enables the device to measure friction at a single point rather than derive a friction measurement through offset pressure measurements.

In some embodiments, a single capacitive sensor may overlay a single FSR.

In other embodiments, two or more capacitive sensors may overlay a single FSR. Preferably, in such embodiments, the two or more capacitive sensors may be arranged in a side-by-side arrangement and oriented relative to each other to detect sliding motion in different axial directions.

In yet other embodiments, a single capacitive sensor may overlay two or more FSRs arranged side-by-side for measuring force distribution in two or more axes.

In some embodiments, the device may further include one or more tail shields for covering and insulating the respective tails extending from the at least one FSR and the at least one capacitive sensor.

In some such embodiments, the tail shield or shields may form part of the cover layer.

According to a fifth aspect of the present invention, there is provided an insole device for use in prevention of diabetic foot ulcers, said pad including:

a printed electronic sensing device configured to be applied to an upper surface of the insole device for measuring friction, said device including:
   a flexible, substantially planar substrate formed from at least two layers, including an outer layer and an inner layer;
   at least one force sensing resistor (FSR) additively printed between the at least two layers of the substrate, said FSR configured to sense force exerted by a foot of a subject relative to the device and the insole device; and
   at least one capacitive sensor additively printed on an outer surface of at least one of the inner layer and the outer layer of the substrate, said at least one capacitive sensor configured to sense sliding of the foot relative to the outer surface of the device and the insole device,
   wherein the at least one FSR and the at least one capacitive sensor together enable the device to measure friction of parts or portions of the foot relative to the device and the insole device for predicting onset of a diabetic foot ulcer.

According to a sixth aspect of the present invention, there is provided an insole device for use in subject rehabilitation, said device including:

a printed electronic sensing device configured to be applied to an upper surface of the insole device for measuring friction, said device including:
   a flexible, substantially planar substrate formed from at least two layers, including an outer layer and an inner layer;
   at least one force sensing resistor (FSR) additively printed between the at least two layers of the substrate, said FSR configured to sense force exerted by a foot of the subject relative to the device and the insole device; and
   at least one capacitive sensor additively printed on an outer surface of at least one of the inner layer and the outer layer of the substrate, said at least one capacitive sensor configured to sense sliding of the foot relative to the outer surface of the device and the insole device,
   wherein the at least one FSR and the at least one capacitive sensor together enable the device to measure friction of parts or portions of the foot relative to the device and the insole for analysis of the subject's foot when walking, running, jumping, standing, sitting and/or changing direction.

According to a seventh aspect of the present invention, there is provided an insole device for use in subject analysis, said device including:

a printed electronic sensing device configured to be applied to an upper surface of the insole device for measuring friction, said device including:
   a flexible, substantially planar substrate formed from at least two layers, including an outer layer and an inner layer;
   at least one force sensing resistor (FSR) additively printed between the at least two layers of the substrate, said FSR configured to sense force exerted by a foot of the subject relative to the device and the insole device; and
   at least one capacitive sensor additively printed on an outer surface of at least one of the inner layer and the outer layer of the substrate, said at least one capacitive sensor configured to sense sliding of the foot relative to the outer surface of the device and the insole device,
   wherein the at least one FSR and the at least one capacitive sensor together enable the device to measure friction of parts or portions of the foot relative to the device and the insole for analysis of the subject's foot when walking, running, jumping, standing, sitting and/or changing direction.

The insole device may include one or more features or characteristics of the printed electronic sensing device as hereinbefore described.

The insole device may be of any suitable size, shape and construction for insertion into a subject's shoe, preferably removable insertion.

In some embodiments, the printed electronic sensing device may be of integral construction with the insole device.

In other embodiments, the printed electronic sensing device and the insole device may be of separate construction. In such embodiments, the printed electronic sensing device may be fastened to an upper surface of the insole device with one or more fasteners as previously described, preferably chemical fasteners (such as, e.g., a thermo adhesive, a wet adhesive, a dry adhesive or a double-sided adhesive tape).

In preferred embodiments, the printed electronic sensing device may include a plurality of FSRs and a plurality of like-sized capacitive sensors overlaying at least most of the plurality of FSRs.

The plurality of FSRs and capacitive sensors and the device may be arranged in any suitable arrangement and location on the insole device. Typically, the plurality of FSRs and capacitive sensors of the device may be arranged on an upper surface of the insole device for measuring an interface between the foot plantar surface and the shoe sole.

As used herein, "foot plantar surface" is a surface of a sole of a foot that interfaces with a support surface during everyday locomotor activities. Typically, the foot plantar surface may include a fore-foot and heel pad of the foot, preferably at least one or more of the medial calcaneal tubercle, the metatarsal heads, the fifth metatarsal base and the primary and secondary phalanges.

Apart from foot analysis, the insole device may further enable analysis of a subject's gait when walking, running, jumping, standing, sitting and/or changing direction.

Depending on the aspect, the subject may be an individual with diabetes, a patient, an athlete or simply an individual, such as, e.g., a service person.

In some embodiments, the insole device may further include a microcomputer operatively associated with the insole device for receiving data from the plurality of FSRs indicative of the pressure exerted by a foot of a subject relative to the insole device and for receiving data from the plurality of capacitive sensors indicative of sliding movement of the foot plantar surface of the subject relative to the insole device.

The microcomputer may include one or more processors and a memory and may be operatively associated with the insole device in any suitable way.

For example, in some embodiments, the microcomputer may be electrically connected to the tail or tails extending from each of the FSRs and the capacitive sensors.

In other embodiments, the microcomputer may be remotely connected to the insole device by a wireless communications module connected to the tail or tails extending from each of the FSRs and the capacitive sensors. For example, the wireless communications module may be in the form of a wireless network interface controller, such that the insole device may connect to the microcomputer via a wireless network (e.g., Wi-Fi (WLAN) communication, Satellite communication, RF communication, infrared communication, or Bluetooth™).

In some embodiments, the microcomputer may include a computing device, such as, e.g., a laptop or a desktop. In such embodiments, software may be provided to be run on the computing device and enable a user to interact with and control operation of the insole device.

In other embodiments, the microcomputer may include a mobile computing device, such as, e.g., a smart phone, a tablet, or a smart watch. In such embodiments, the microcomputer may include software in the form of an application (i.e., an app) configured to run on the mobile computing device and allow a user to interact with and control operation of the insole device.

Responsive to receiving data indicative of pressure and sliding movement of the foot relative to the insole device, the microcomputer may determine a force of friction measurement of the foot or parts thereof.

In some embodiments, the microcomputer may on command, continuously or periodically collect data from each of the FSRs and the capacitive sensors and generate a normal profile of friction vectors on a foot of a subject under normal walking, running, jumping, standing, changing direction and/or sitting conditions. The profile may be stored in a database.

Friction measurements may be continuously compared to the normal profile for reduced or elevated friction that may be indicative of onset of a diabetic foot ulcer.

The microcomputer may further be configured to generate an alert when a portion or part of the foot exhibits reduced or elevated friction relative to the normal profile of friction vectors, preferably localised reduced or elevated friction relative to the normal profile of friction vectors.

In embodiments in which the subject is an athlete, and responsive to receiving data, the microcomputer may further determine any one of stride rate, contact time, flight time, movement asymmetries and ground reaction forces.

In embodiments in which the subject is a patient, and responsive to receiving data, the microcomputer may further determine any one of sitting time, standing time, walking stability, running stability and jumping stability.

In embodiments in which the subject is an individual, and responsive to receiving data, the microcomputer may further determine any one of sitting time, standing time and/or prone time. For example, and in relation to the latter, extended prone time may be indicative that a service person, such as, e.g., a solider, is injured or incapacitated.

In some embodiments, the microcomputer may include, or be operatively associated with, at least one audio signalling device for generating at least one audio signal when reduced or elevated friction is determined, such as, e.g., a buzz, a beep, a chirp, a siren or the like.

In some embodiments, the microcomputer may include, or be operatively associated with, at least one visual signalling device for generating at least one visual signal when reduced or elevated friction is determined, such as, e.g., a flashing light or a message on a screen or display of the microcomputer.

In some embodiments, the microcomputer may generate and transmit an alert to an external device, such as, e.g., a smart phone, a smart watch or tablet device, when reduced or elevated friction is determined.

In some embodiments, the insole device may form part of a monitoring system. In such embodiments, the system may further include at least one power source for powering the insole device and/or the microcomputer.

The at least one power source may include an on-board power source, such as, e.g., one or more batteries, preferably rechargeable batteries. For example, in some embodiments, it is envisaged that the one or more rechargeable batteries may be recharged by the kinetic energy measured as friction by the insole device.

According to an eighth aspect of the present invention, there is provided a robotic gripping device including at least a pair of gripping members moveable relative to one another for gripping and releasing objects, wherein at least one of the gripping members includes a printed electronic sensing device in accordance with any one of the first to fourth aspects of the present invention.

According to a ninth aspect of the present invention, there is provided a robotic prosthetic hand including one or more articulated digits configured to be selectively moveable for gripping and releasing objects, wherein the one or more articulated digits may each include a printed electronic sensing device in accordance with any one of the first to fourth aspects of the present invention.

In some embodiments, the printed electronic sensing device may be of integral construction with the gripping member or the digit.

In other embodiments, the printed electronic sensing device and the gripping member or digit may be of separate construction. Again, in such embodiments, the printed electronic sensing device may be fastened to an object engaging surface of the gripping member or digit with one or more fasteners as previously described.

In some embodiments, the at least one capacitive sensor of the printed electronic sensing device may be configured as a capacitive proximity sensor for detecting or sensing proximity of the gripping member or digit to an object. Advantageously, in such embodiments, the capacitive proximity sensor may at least partially assist in the fine motor control and/or movement of the gripping member or the digit towards the object. Further, in such embodiments, the at least one FSR may assist in applying a necessary amount of pressure to grip the object.

In other embodiments, the at least one capacitive sensor of the printed electronic sensing device may be configured with a capacitive slider mechanism for detecting or sensing sliding motion of an object relative to the printed electronic sensing device and the gripping member or digit. In such embodiments, the capacitive slider mechanism and the at least one FSR may enable the gripping member or digit to advantageously grip an object with a minimum amount of pressure required to securely grip the object without it slipping between the gripping members or digits.

In preferred embodiments, the printed electronic sensing device may include a plurality of FSR overlaid with a plurality of capacitive sensors, preferably equally sized capacitive sensors. Typically, the plurality of FSR and capacitive sensors may be arranged on the printed electronic sensing device and the gripping member or digits for sensing or detecting the interface between the gripping members and digits and the object.

As with the insole device, the robotic gripping device and robotic prosthetic hand may further include a microcomputer operatively associated with the device or prosthetic for receiving data from the plurality of FSRs indicative of the pressure exerted by the gripping members or digits relative to the object and for receiving data from the plurality of capacitive sensors indicative of proximity or sliding movement of the object relative to the gripping members or digits.

The microcomputer may include one or more processors and a memory and may be operatively associated with the insole device in any suitable way.

For example, in some embodiments, the microcomputer may be electrically connected to the tail or tails extending from each of the FSRs and the capacitive sensors.

In other embodiments, the microcomputer may be remotely connected to the device or hand by a wireless communications module connected to the tail or tails extending from each of the FSRs and the capacitive sensors. For example, the wireless communications module may be in the form of a wireless network interface controller, such that the device or hand may connect to the microcomputer via a wireless network (e.g., Wi-Fi (WLAN) communication, Satellite communication, RF communication, infrared communication, or Bluetooth™).

In some embodiments, the microcomputer may include a computing device, such as, e.g., a laptop or a desktop. In such embodiments, software may be provided to be run on the computing device and enable a user to interact with and control operation of the device or hand.

In other embodiments, the microcomputer may include a mobile computing device, such as, e.g., a smart phone, a tablet, or a smart watch. In such embodiments, the microcomputer may include software in the form of an application (i.e., an app) configured to run on the mobile computing device and allow a user to interact with and control operation of the device or hand.

In some embodiments, responsive to receiving data indicative of proximity of the object relative to the gripping members or digits, the microcomputer may determine and actuate movement of the gripping member or digits to be close enough to grip the object.

In some embodiments, responsive to receiving data indicative of pressure and/or sliding movement of the object relative to the device or prosthetic, the microcomputer may determine a minimum force required to hold the object and actuate movement of the gripping members or digits to apply the minimum force.

According to a tenth aspect of the present invention, there is provided a disc brake assembly including a printed electronic sensing device in accordance with any one of the first to fourth aspects for measuring wear of a brake pad associated with the assembly.

Typically, wear may be measured by detecting or sensing a proximity of a brake disc to the device, wherein wear is inversely proportional to a proximity of the brake disc to the device.

According to an eleventh aspect of the present invention, there is provided a method of forming a printed electronic sensing device, said method including:

providing a flexible substantially planar substrate having a pair of opposed surfaces, including a first surface and an opposed second surface;

additively printing on the first surface at least one force sensing resistor (FSR) for sensing pressure; and additively printing on the second surface at least one capacitive sensor for sensing at least one of sliding of an object relative to the second surface and proximity of the object relative to the second surface.

According to a twelfth aspect of the present invention, there is provided a method of forming a printed electronic sensing device, said method including:

providing a flexible substantially planar substrate formed from at least two layers, including an outer layer and an inner layer;

additively printing between the at least two layers of the substate at least one force sensing resistor (FSR) for sensing pressure; and additively printing on an outer surface of at least one of the inner layer and the outer layer of the substrate at least one capacitive sensor for sensing at least one of sliding of an object across the outer surface and proximity of the objection relative to the outer surface.

The methods of the eleventh and twelfth aspects may include one or more characteristics or features of the printed electronic sensing device as hereinbefore described.

The flexible substantially planar substrate may generally be a thin flexible substrate.

The substrate may be of any suitable size, shape and construction, and may be formed from any suitable material or materials.

In other embodiments, the substrate may be formed from a plastic material or materials. For example, the substrate may be formed from polyester, polyethylene terephthalate ("PET"), polyethylene naphthalate ("PEN"), polyimide ("PI") or polyurethane ("PU"), typically PET.

In other embodiments, the substrate may be formed from paper, fabric or textile.

In preferred embodiments, the substrate may include a multi-layer substrate. For example, the substrate may include at least two layers, at least three layers, at least four layers or even at least five layers. In such embodiments, the multi-layers may be at least partially bonded to one another, such as, e.g., along a common edge. Alternatively, the multi-layers may be sandwiched or stacked atop one another and bonded together, such as, e.g., by lamination.

As indicated, the printed electronic sensing device includes at least one FSR additively printed between the at least two layers of the substrate and at least one capacitive sensor additively printed on the outer surface of an inner or outer layer of the substrate, preferably the outer surface of the outer layer.

Generally, the at least one FSR may be additively printed in parts.

For example, a conductive layer including electrically conductive traces of the at least one FSR may be additively printed on an inner surface of a lowermost of the at least two layers of the substrate. The conductive layer may be printed with a combination of electrically conductive ink and dielectric ink to ensure the traces remain electrically distinct.

In preferred embodiments, a tail or tails may be additively printed extending from the respective conductive traces for connection to a communication module or external component, such as, e.g., a microcomputer.

The FSR element layer may be additively printed on a lower surface of an uppermost of the at least two layers of the substrate with a force sensitive ink, e.g., a carbon conductive ink. The FSR element layer may be printed to be of a same size as the conductive layer and to precisely overlie the underlying conductive layer.

In preferred embodiments, a spacer layer may be at least partially adhered between the at least two layers of the substrate to space apart the conductive layer and the FSR element layer of the at least one FSR. The spacer layer may extend around an edge of both the conductive layer and the FSR element layer to thereby define a space therebetween but also enable the layers to contact when a force is applied.

The at least one capacitive sensor may include a conductive layer having electrically conductive traces, preferably of the same size as the conductive traces of the at least one FSR and configured to overlay the conductive layer of the FSR in an electrically insulated manner. The conductive traces of the at least one capacitive sensor may be additively printed on the outer surface of the substrate with a combination of electrically conductive ink and dielectric ink to ensure the traces remain electrically distinct.

In preferred embodiments, a tail may be additively printed extending from the respective conductive traces for connection to a communication module or external component, such as, e.g., a microcomputer.

In some embodiments, a cover layer may be applied atop the outer surface to shield and protect the at least one capacitive sensor. The cover layer may additionally or alternatively shield the tail or tails extending from the respective conductive traces.

In some embodiments, the respective layers of the substrate may be laminated to provide a laminated, printed electronic sensing device.

In some embodiments, the laminated, printed electronic sensing device may be die cut to a desired shape and/or size.

According to a thirteenth aspect of the present invention, there is provided a method of prevention of diabetic foot ulcers, said method including:

providing a subject with an insole device in accordance with the fifth aspect of the present invention for insertion into a shoe of the subject;

receiving and monitoring data output from the printed electronic sensing device of the insole device;

generating, based on the data received and monitored, a normal profile of friction vectors of a foot of the subject; and generating an alert when a portion or part of the foot exhibits reduced or elevated friction relative to the normal profile thereby indicative of onset of a diabetic foot ulcer.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIG. 3 is a flowchart showing steps in a method of prevention of diabetic foot ulcers according to an embodiment of the present invention; and FIG. 4 is a flowchart showing steps in a method of forming a printed electronic sensing device according to an embodiment of the present invention.

DETAILED DESCRIPTION

Figure 1:
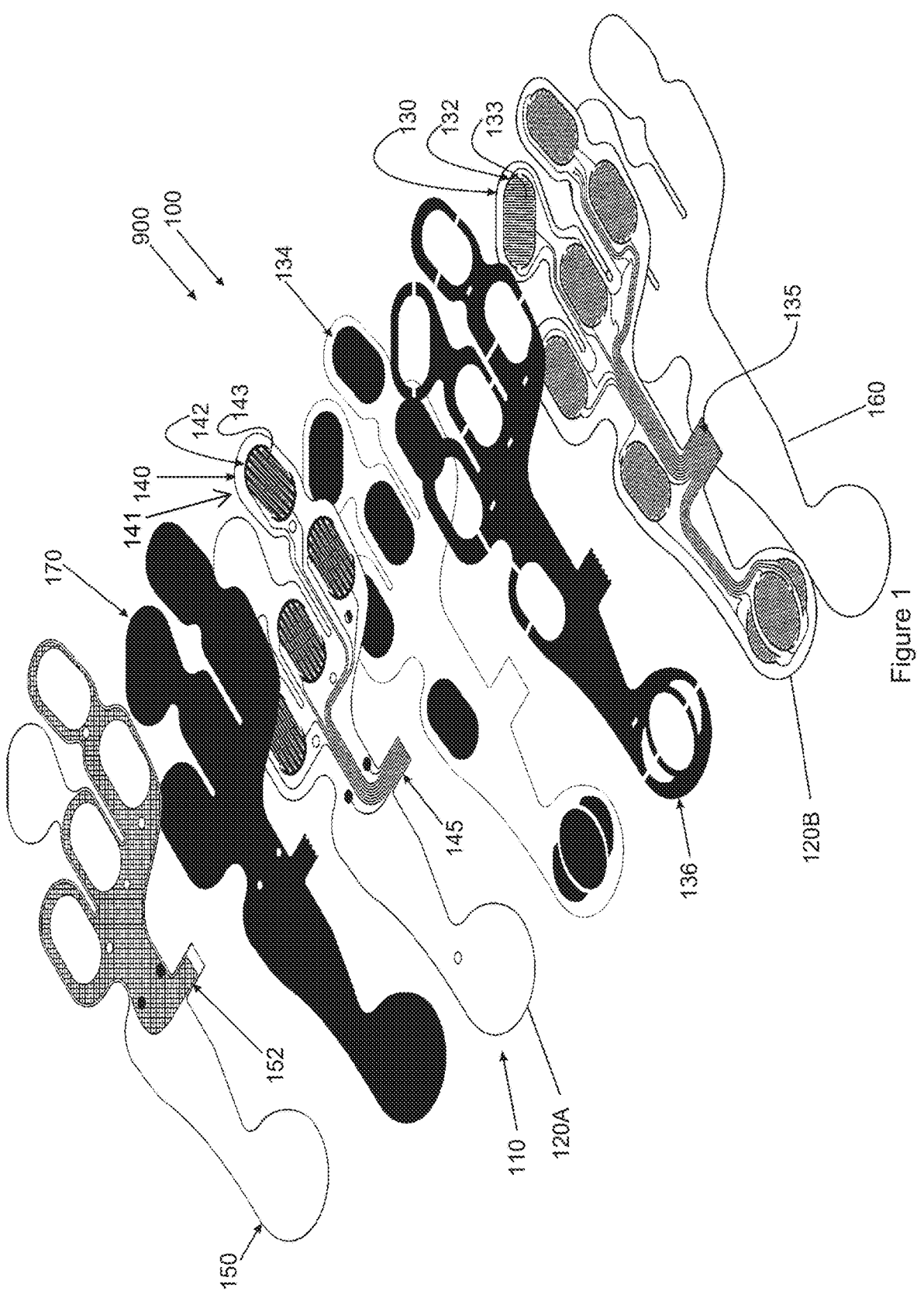
FIG. 1 is a schematic showing an exploded view of an insole device according to an embodiment of the present invention including a printed electronic sensing device having a plurality of force sensing resistors and capacitive sensors.

FIG. 1 shows the application of a printed electronic sensing device (100) according to an embodiment of the present invention as an insole device (900) for insertion into a subject's shoe for the prevention of diabetic ulcers.

Referring to FIG. 1, the printed electronic sensing device (100) includes: a flexible, substantially planar substrate (110) formed from two layers (120), including an outer layer (120A) and an inner layer (120B); discrete arrays of force sensing resistors (130; FSRs) configured to sense the pressure exerted by the subject's foot on the device (100) are additively printed between the two layers (120); and discrete arrays of capacitive sensors (140) configured to sense sliding of the foot relative to the device (100) and the insole device (900) are additively printed on an outer surface of the outer layer (120B) of the substrate (110).

The discrete arrays of capacitive sensors (140) precisely overlay most of the discrete arrays of FSRs (130) so as to enable the device (100) to measure a frictional force of the subject's foot relative to the device (100) and the insole device (900).

The substrate (110) is formed from PET.

The two layers (120) of the substrate are identically sized and shaped for insertion and placement in the subject's shoe. The layers (120) are configured to be stacked relative to one another and bonded together with adhesive to form the device (100) and the insole device (900).

As shown, an adhesive layer (160) is applied to a lower surface of the inner layer (120B) of the substrate (110) for adhering the device (100) and the insole device (900) in place atop the inner sole of the subject's shoe.

Each FSR (130) includes a conductive layer (132) and a FSR element layer (134) spaced apart from the conductive layer (132). The conductive layer (132) and the FSR element layer (134) are arranged relative to each another such that the conductive layer (132) and the FSR element layer (134) face each other.

In use, the FSR element layer (134) is configured to contact the conductive layer (132) when a force is applied, such as, e.g., by the subject's foot, and cause a change in resistivity that is inversely proportional to the force applied and thereby indicative of the force applied.

Approximate pressure or force measurements for a given resistance can be derived from the inverse proportional relationship between resistance and force applied.

The discrete arrays of FSRs (130) are additively printed in part on an upper surface of the inner layer (120B) and a lower surface of the outer layer (120A).

Specifically, the conductive layer (132) of each FSR (130) includes two electrically conductive traces arranged in electrically distinct interdigitated fingers (133) that are additively printed on the upper surface of the inner layer (120B) with a combination of silver conductive ink and dielectric ink to ensure that the two traces remain electrically distinct.

Each trace includes a tail (135) electrically connectable to a communication module or microcomputer that will be described later.

The FSR element layer (134) of each FSR (130) is additively printed on the lower surface of the outer layer (120A) with a force sensitive ink, such as, a carbon conductive ink.

The FSR element layer (134) of each FSR (130) is printed to precisely match a size and shape of its corresponding conductive layer (132). As indicated above, the FSR element layer (134) of each FSR (130) is configured to deflect and yield to a force applied thereon and contact the underlying corresponding conductive layer (132).

As shown, the conductive layer (132) and the FSR element layer (134) of each FSR (130) are spaced apart from each other by a spacer layer (136) extending therebetween. The spacer layer (136) extends around an edge of both the conductive layer (132) and the FSR element layer (134) to thereby define the space therebetween but also enable the layers (132,134) to contact when a force is applied.

The spacer layer (136) is formed from a dielectric material.

In use, when no force is applied, the space between the conductive layer (132) and the FSR element layer (134) of each FSR is maintained by the spacer layer (136) and the FSR (130) is an open circuit.

Each capacitive sensor (140) includes a conductive layer (142) including two electrically conductive traces arranged in electrically distinct interdigitated fingers (143; i.e., a spatial interpolation arrangement).

The conductive layer (142) is additively printed on an outer surface of the outer layer (120A) of the substrate (110) with a combination of silver conductive ink and dielectric ink to ensure that the two traces remain electrically distinct. Each capacitive sensor (140) precisely overlays a corresponding FSR (130) in an electrically insulated manner.

Like with the FSR (130), each trace of a capacitive sensor (140) includes a tail (145) electrically connectable to a communication module or microcomputer that will be described later.

Each capacitive sensor (140) includes, or forms part of, a capacitive slider mechanism (141) for detecting or sensing sliding motion of an object across the outer surface of the outer layer (120A) of the substrate (110). Each capacitive sensor (140) detects the sliding motion of the subject's foot by sensing a change in capacitance at the location at which the foot contacts the sensor (140) and a direction in which the foot slides is determined by a resulting change in capacitance of the sensor (140) and the direction in which that change occurs. Accordingly, the direction in which the foot slides relative to the sensor (140) is sensed based upon the direction of resulting changes in capacitance of the electrically distinct interdigitated fingers (143).

Each sensor (140) detects sliding motion in a single axial direction, i.e., laterally across a width of the insole device (900) as shown in FIG. 1.

As shown, the discrete arrays of FSRs and capacitive sensors (130, 140) are arranged on an upper surface of the insole device (900) for measuring the interface between the subject's foot plantar surface and the inner sole of the shoe.

As used herein, "foot plantar surface" is a surface of a sole of a foot that interfaces with a support surface during everyday locomotor activities. The foot plantar surface include a fore-foot and heel pad of the foot, preferably at least one or more of the medial calcaneal tubercle, the metatarsal heads, the fifth metatarsal base and the primary and secondary phalanges.

As shown, the device (100) further includes a cover layer (150) configured to cover the outer surface of the outer layer (120A) of the substrate (110) and the array of capacitive sensors (140) printed thereon.

The cover layer (150) is of the same size and shape as the two layers (120) of the substrate (100) and is also formed from PET. The cover layer (150) further includes a tail shield (152) for shielding and covering the tails extending from the capacitive sensors (140).

Optionally, and as shown, in some embodiments, the device (100) further includes a dielectric layer (170) formed from a dielectric material positioned between the cover layer (150) and the outer surface of the outer layer (120A).

Advantageously, by sensing force or pressure in conjunction with sliding movement of the foot relative to the device (100) and insole device (900), the device (100) can measure the force of friction of the foot relative to the device (100). For example, the FSRs (130) provide an indication of the normal force compressing the foot against the device (100) and the capacitive sensor (140) provides an indication as to when the foot initially slides relative to the device (100).

As indicated, the insole device (900) is operatively associated with a microcomputer (not shown) for receiving data from the FSRs (130) indicative of the pressure exerted by the foot of the subject relative to the insole device (900) and for receiving data from the capacitive sensors (140) indicative of sliding movement of the foot plantar surface of the subject relative to the insole device (900).

The microcomputer includes one or more processors and a memory.

The microcomputer is remotely connected to the insole device (900) by a wireless communications module connected to the tail or tails extending from the device (100).

For example, the wireless communications module may be in the form of a wireless network interface controller, such that the insole device may connect to the microcomputer via a wireless network (e.g., Wi-Fi (WLAN) communication, Satellite communication, RF communication, infrared communication, or Bluetooth™).

The microcomputer includes software enabling the subject to interact with and control operation of the device (100) and insole device (900).

Responsive to receiving data indicative of pressure and sliding movement of a subject's foot relative to the device (100) and insole device (900), the microcomputer can determine a force of friction measurement of the foot.

In some embodiments, the microcomputer can on command, continuously or periodically collect data from each of the FSRs (130) and the capacitive sensors (140) and generate a normal profile of friction vectors on the foot of the subject under normal walking, running, standing and sitting conditions. The normal profile is stored in a database on the microcomputer or remotely.

Subsequent friction measurements can be continuously compared to the normal profile for reduced or elevated friction relative thereto, which may be indicative of onset of a diabetic foot ulcer.

In some embodiments, the microcomputer is further configured to generate an alert when a portion or part of the subject's foot exhibits reduced or elevated friction relative to the normal profile, typically localised reduced or elevated friction relative to the normal profile.

Figure 2:
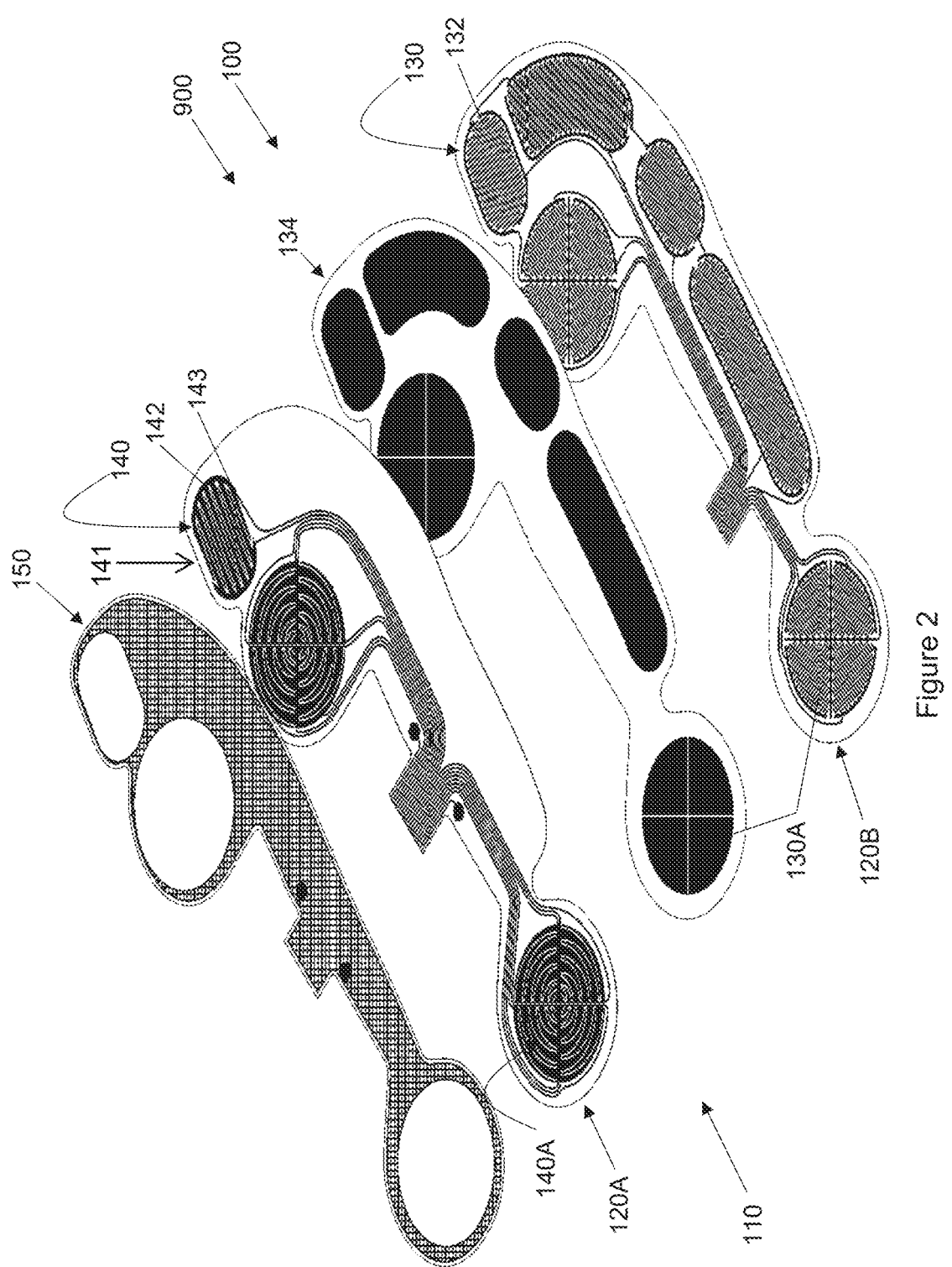
FIG. 2 is another schematic showing an exploded view of an insole device according to another embodiment of the present invention.

FIG. 2 shows another embodiment of the printed electronic sensing device (100) being used as an insole device (900). For convenience, features that are similar or correspond to features of the earlier embodiment will be referenced with the same reference numerals.

The device (100) includes a flexible, substantially planar substrate (110) formed from two layers (120), including an outer layer (120A) and an inner layer (120B); discrete arrays of FSRs (130) configured to sense the pressure exerted by a subject's foot on the device (100) are additively printed between the two layers (120); and discrete arrays of capacitive sensors (140) configured to sense sliding of the foot relative to the device (100) and the insole device (900) are additively printed on an outer surface of the outer layer (120B) of the substrate (110).

The discrete arrays of capacitive sensors (140) precisely overlay the discrete array of FSRs (130) so as to enable the device (100) to measure frictional force of the subject's foot relative to the device (100) and the insole device (900).

Each FSR (130) includes a conductive layer (132) and a FSR element layer (134) spaced apart from the conductive layer (132). The conductive layer (132) and the FSR element layer (134) are arranged relative to each other such that the conductive layer (132) and the FSR element layer (134) face each other. A spacer layer (136; not shown) maintains a space between the layers (132, 134) unless a force is applied.

Each capacitive sensor (140) includes a conductive layer (142) including two electrically conductive traces arranged in an electrically distinct interdigitated fingers (143).

In this embodiment, the FSRs (130A) and capacitive sensors (140A) of the device (100) each include four FSRs (130A) and four capacitive sensors (140A) arranged in a side-by-side arrangement and forming quarters of the circular-shaped sensors (130A, 140A).

The four FSRs (130A) enable force distribution to be measured in four axes.

Likewise, the four capacitive sensors (140A) are oriented relative to each other to enable sliding motion to be detected and measured in four axial directions.

Advantageously, the four FSRs (130A) together with the four capacitive sensors (140A) together enable frictional forces to be measured in four axial directions and thereby quantitate movements, such as, e.g., when a subject is twisting.

Like with the earlier embodiment, the device (100) further includes a cover layer (150) configured to cover the outer surface of the outer layer (120A) of the substrate (110) and the array of capacitive sensors (140) printed thereon.

A method (300) of using the insole device (900) as shown in FIG. 1 will now be described in detail with reference to FIG. 3.

The method (300) includes an initial step of inserting and adhering the insole device (900) to an inner sole of a shoe.

At step 310, the microcomputer operatively associated with the insole device (900) receives and monitors data indicative of the pressure exerted by the foot of the subject relative to the insole device (900) and of sliding movement of the foot plantar surface of the subject relative to the insole device (900).

Responsive to receiving the data, the microcomputer determines a force of friction measurement of the foot or part or portion thereof.

At step 320 and based on the data received and monitored at step 310, the microcomputer generates a normal profile of friction vectors of the foot of the subject under normal walking, running, standing and sitting conditions. The normal profile is stored in a database in the memory of the microcomputer or remotely.

The normal profile is updated on command, continuously or periodically based on the data received and monitored at step 310.

At step 330, the microcomputer is configured to generate an alert when the foot of the subject or part or portion thereof exhibits reduced or elevated friction relative to the normal profile, which may be indicative of the onset of a diabetic foot ulcer.

The microcomputer can generate an audible or visual signal or can transmit a message to an external device, such as, e.g., the subject's mobile telephone.

A method (400) of forming the printed electronic sensing device (100) as shown in FIG. 1 will now be described in detail with reference to FIG. 4.

At step 410, the method (300) includes providing a flexible substantially planar substrate (110) formed from two layers (120), including an outer layer (120A) and an inner layer (120B).

The substrate (110) is generally a thin flexible substrate formed from PET.

At step 420, discrete arrays of FSRs (130) are additively printed between the two layers (120) of the substrate (110).

Specifically, a conductive layer (132) including electrically conductive traces of the FSRs (130) are additively printed on an upper surface of the inner layer (120B). The conductive layer (132) is printed with a combination of electrically conductive ink and dielectric ink to ensure the traces remain electrically distinct.

Tails are additively printed extending from the respective conductive traces for connection to the communication module for connection to the microcomputer.

The FSR element layer (134) of each FSR (130) is additively printed on a lower surface of the outer layer (120B) of the substrate (110) with a force sensitive ink, such as, a carbon conductive ink. For each FSR (130), the FSR element layer (134) is printed to be of a same size as its corresponding conductive layer (132) and to precisely overlie the underlying conductive layer (132).

A spacer layer (136) is adhered between the two layers (120) of the substrate (110) to space apart the conductive layer (132) and the FSR element layer (134) of each FSR (130). The spacer layer (136) extends around an edge of both the conductive layer (132) and the FSR element layer (134) to define a space therebetween but also enable the layers (132, 134) to contact when a force is applied.

At step 430, discrete arrays of capacitive sensors (140) are additively printed on the outer surface of the outer layer (120A) of the substrate (110).

Specifically, a conductive layer (143) having a set of electrically conductive traces arranged in electrically distinct interdigitated fingers (143; i.e., a spatial interpolation arrangement) are additively printed on the outer surface with a combination of electrically conductive ink and dielectric ink to ensure the traces remain electrically distinct.

Again, tails are additively printed extending from the respective conductive traces for connection to the communication module for connection to the microcomputer.

In some embodiments, the method (400) further includes applying cover layer (150) over the outer surface of the outer layer (120A) of the substrate (110) and the array of capacitive sensors (140) printed thereon.

The cover layer (150) is of the same size and shape as the two layers (120) of the substrate (100) and is also formed from PET. The cover layer (150) further includes a tail shield (152) for shielding and covering the tails extending from the capacitive sensors (140).

In some embodiments, the layers (120) of the substrate (110), including the cover layer (150) are laminated to provide a laminated, printed electronic sensing device (100).

In some embodiments, the laminated, printed electronic sensing device (100) is die cut to a desired shape and/or size, such as, e.g., an insole device (900).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A printed electronic sensing device for measuring friction of an object relative to the device, said device comprising:

a flexible, substantially planar substrate formed from at least two layers, including an outer layer and an inner layer;

at least one force sensing resistor (FSR) additively printed between the at least two layers of the substrate, said FSR configured to sense pressure of the object relative to the device; and at least one capacitive sensor additively printed on an outer surface of at least one of the inner layer and the outer layer of the substrate, said at least one capacitive sensor configured to sense sliding of the object relative to the outer surface of the device, wherein the at least one capacitive sensor is at least partially overlaid atop the at least one FSR so as to enable the device to measure the friction of the object relative to the device at a single point.

2. The device of claim 1, wherein the at least one FSR comprises a conductive layer and a FSR element layer spaced apart from the conductive layer, said conductive layer and said FSR element layer arranged relative to each other such that the conductive layer and the FSR element layer face each other.

3. The device of claim 2, wherein the at least one FSR further comprises a spacer layer between the conductive layer and the FSR element layer, said spacer layer configured to mechanically determine an amount of force required for the conductive layer and the FSR element layer to come into contact and therefore a sensitivity for sensing force of pressure.

4. The device of claim 2, wherein the at least one capacitive sensor comprises a conductive layer configured to overlay the conductive layer of the at least one FSR in an electrically insulated manner.

5. The device of claim 1, wherein the at least one capacitive sensor comprises a capacitive slider mechanism for detecting or sensing sliding motion of an object across the outer surface of the substrate.

6. The device of claim 1, wherein the device comprises a plurality of FSR arranged in a discrete array on the device.

7. The device of claim 6, wherein the device comprises a plurality of capacitive sensors arranged in a discrete array on the device.

8. The device of claim 7, wherein the plurality of capacitive sensors are overlaid atop, and oriented relative to, each other to detect sliding motion in different axial directions.

9. The device of claim 7, wherein the discrete arrays of capacitive sensors are oriented at different angles relative to each other to together detect sliding motion in different axial directions.

10. The device of claim 7, wherein the plurality of capacitive sensors are overlaid atop the plurality of FSR and wherein the plurality of capacitive sensors are oriented relative to each other to detect sliding motion in different axial directions.

11. The device of claim 7, wherein the plurality of capacitive sensors are overlaid atop the plurality of FSR and wherein two or more capacitive sensors are overlaid atop each FSR in a side-by-side arrangement and oriented relative to each other to detect sliding motion in different axial directions.

12. The device of claim 6, wherein the plurality of FSR include discrete arrays of two or more FSRs arranged side-by-side for measuring force distribution in two or more axes.

13. The device of claim 12, wherein the device comprises a plurality of capacitive sensors arranged in a discrete array on the device and wherein the plurality of capacitive sensors are overlaid atop the plurality of FSR with at least one capacitive sensor on top of each discrete array of two or more FSRs.

14. The device of claim 1, wherein the device further comprises a communication module or microcomputer and wherein each of the at least one FSR and the at least one capacitive sensor comprises a tail electrically connectable to the communication module or microcomputer.

15. The device of claim 14, further comprising one or more tail shields for covering and insulating the tail extending from each of the at least one FSR and the at least one capacitive sensor.

16. An insole device for use in prevention of diabetic foot ulcers, said device including:

a printed electronic sensing device configured to be applied to an upper surface of the insole device for measuring friction, said device including:

a flexible, substantially planar substrate formed from at least two layers, comprising an outer layer and an inner layer;

at least one force sensing resistor (FSR) additively printed between the at least two layers of the substrate, said FSR configured to sense force exerted by a foot of a subject relative to the device and the insole device; and at least one capacitive sensor additively printed on an outer surface of at least one of the inner layer and the outer layer of the substrate, said at least one capacitive sensor configured to sense sliding of the foot relative to the outer surface of the device and the insole device, wherein the at least one capacitive sensor is at least partially overlaid atop the at least one FSR so as to enable the device to measure friction of parts or portions of the foot relative to the device and the insole device at a single point for predicting onset of a diabetic foot ulcer.

17. The insole device of claim 16, wherein the printed electronic sensing device comprises a plurality of FSRs and a plurality of like-sized capacitive sensors overlaying at least most of the plurality of FSRs.

18. The insole device of claim 17, wherein the plurality of FSRs and the plurality of capacitive sensors are arranged on an upper surface of the insole device for measuring an interface between the foot plantar surface and the insole device.

19. The insole device of claim 17, further comprising a microcomputer operatively associated with the insole device for receiving data from the plurality of FSRs indicative of pressure exerted by a foot relative to the insole device and for receiving data from the plurality of capacitive sensors indicative of sliding movement of the foot plantar surface relative to the insole device.

20. The insole device of claim 19, wherein responsive to receiving data indicative of pressure and sliding movement of the foot relative to the insole device, the microcomputer determines a force of friction measurement of the foot.

* * * * *